(12) United States Patent
Compain et al.

(10) Patent No.: US 8,458,024 B1
(45) Date of Patent: Jun. 4, 2013

(54) VALUE REGULATION BASED ADVERTISING

(75) Inventors: Adam J. Spanky Compain, San Francisco, CA (US); Tia Gao, Rockville, MD (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/465,949

(22) Filed: May 7, 2012

(51) Int. Cl.
*G06Q 30/00* (2012.01)

(52) U.S. Cl.
USPC .................................................. 705/14.16

(58) Field of Classification Search
USPC .................................................. 705/14.16
See application file for complete search history.

(56) References Cited

U.S. PATENT DOCUMENTS

| 8,126,806 | B1 * | 2/2012 | DiMartino et al. | 705/41 |
| 2002/0004783 | A1 * | 1/2002 | Paltenghe et al. | 705/41 |
| 2005/0131761 | A1 * | 6/2005 | Trika et al. | 705/14 |
| 2009/0144164 | A1 * | 6/2009 | Wane et al. | 705/17 |
| 2010/0010964 | A1 * | 1/2010 | Skowronek et al. | 707/3 |
| 2012/0209677 | A1 * | 8/2012 | Mehta et al. | 705/14.16 |
| 2012/0215618 | A1 * | 8/2012 | Myman et al. | 705/14.35 |
| 2013/0006733 | A1 * | 1/2013 | Fisher | 705/14.12 |

OTHER PUBLICATIONS

"Framework for Mobile Payments Integration; Carton, Fergal; Hedman, Jonas; Damsgaard, Jan; Tan, Kay-Ti; McCarthy, JB; Electronic Journal of Information Systems Evaluation; v15n1; pp. 13-24; Jan. 2012".*

* cited by examiner

*Primary Examiner* — John Weiss
*Assistant Examiner* — Michael Stibley
(74) *Attorney, Agent, or Firm* — King & Spalding LLP

(57) ABSTRACT

An initiator computing device may acquire a digital coupon having a first value. The initiator computing device may share the digital coupon with a recipient computing device. An advertisement server may be notified that the initiator computing device has shared or has an intent to share the digital coupon with the recipient computing device. The advertisement server may calculate a second value associated with the digital coupon and assign the second value to the digital coupon responsive to the initiator computing device sharing the digital coupon with the recipient computing device. Further, the advertisement server may receive logging information associated with sharing the digital coupon. The logging information can facilitate monitoring the influence of the digital coupon.

14 Claims, 7 Drawing Sheets

VALUE REGULATION BASED ADVERTISING

FIELD OF INVENTION

This edisclosure relates generally to a technical field of advertising and, in one example embodiment, to a system, method and an apparatus for value regulation based advertising.

BACKGROUND

Businesses may use digital coupons as an effective means of advertising in the today's digital world. However, businesses may lack sufficiently sophisticated technology for tracing social influence on customer purchase habits. For example, logging how many individuals a customer can influence in promoting a merchant's services and/or goods. Additionally, businesses may lack the technology to engage customers in sharing the digital coupon and thereby spreading an influence of the digital coupon. Businesses may also lack the ability to modify the value of promotions according to their social distribution or acquisition by customers. Conventional technologies may provide inadequate merchant/advertiser (e.g., businesses) control over extending the influence and value of digital coupons. Such limitations may hinder an understanding of customer behavior and thereby limit the effectiveness of the digital coupon. Further, such limitations may result in businesses compromising on their return on advertising spending (ROAS) that represents dollar earned per dollar spend on corresponding advertisement. Thus, there is a need for a technology that provides better control over the influence, value, and logging of digital coupons and improves ROAS of businesses.

SUMMARY

Disclosed are a system, a method and an apparatus for advertising with value regulation and logging of advertising. In one aspect, a method includes receiving, at a server, a share signal. The share signal indicates a transfer of a digital coupon having a first value from an initiator computing device to a recipient computing device over a peer to peer wireless link. In addition, the method includes determining a second value of the digital coupon based on a set of predetermined criteria responsive to receiving the share signal. Further, the method includes assigning the second value to the digital coupon when the digital coupon is received by the recipient computing device.

In another aspect, a computer implemented method includes acquiring, by an initiator computing device, a digital coupon having a first value from an advertisement media. The method includes sharing the digital coupon with a recipient computing device over a peer to peer wireless communication link. Further, the method includes transmitting a share signal to an advertisement server to determine a second value of the digital coupon by the advertisement server responsive to receiving the share signal. The share signal may indicate the sharing of the digital coupon from an initiator computing device to the recipient computing device over a peer to peer wireless link.

In yet another aspect, a method includes acquiring, by an initiator computing device, a digital coupon having a first value from an advertisement media. Further, the method includes transmitting a notify signal to an advertisement server indicating an intent to share the digital coupon with a recipient computing device. In addition, the method includes receiving a second value of the digital coupon from the advertisement server responsive to transmitting the notify signal. Further, the method includes sharing the digital coupon having the second value with the recipient computing device over a peer to peer wireless link.

In a further aspect, a method includes receiving, by a recipient computing device, a digital coupon having a first value. The digital coupon may be transmitted from an initiator computing device over a peer to peer wireless link. The method includes transmitting, by the recipient computing device, a share signal to an advertisement server to determine a second value of the digital coupon by the advertisement server responsive to receiving the share signal. The share signal may indicate a sharing of the digital coupon from an initiator computing device to the recipient computing device over a peer to peer wireless link. Further, the method includes storing the digital coupon having the second value in a virtual wallet associated with the recipient computing device.

In one aspect, a system includes an advertisement server configured to receive a share signal indicating a transfer of a digital coupon having a first value from an initiator computing device to a recipient computing device over a peer to peer wireless link. Further, the advertisement server is configured to determine a second value of the digital coupon based on a set of predetermined criteria responsive to receiving the share signal. In addition, the advertisement server is configured to assign the second value to the digital coupon when the digital coupon is received by the recipient computing device.

These and other aspects, features and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

Example embodiments are illustrated by way of example and not limitation in the figures of the accompanying drawings, in which.

Figure 1A:
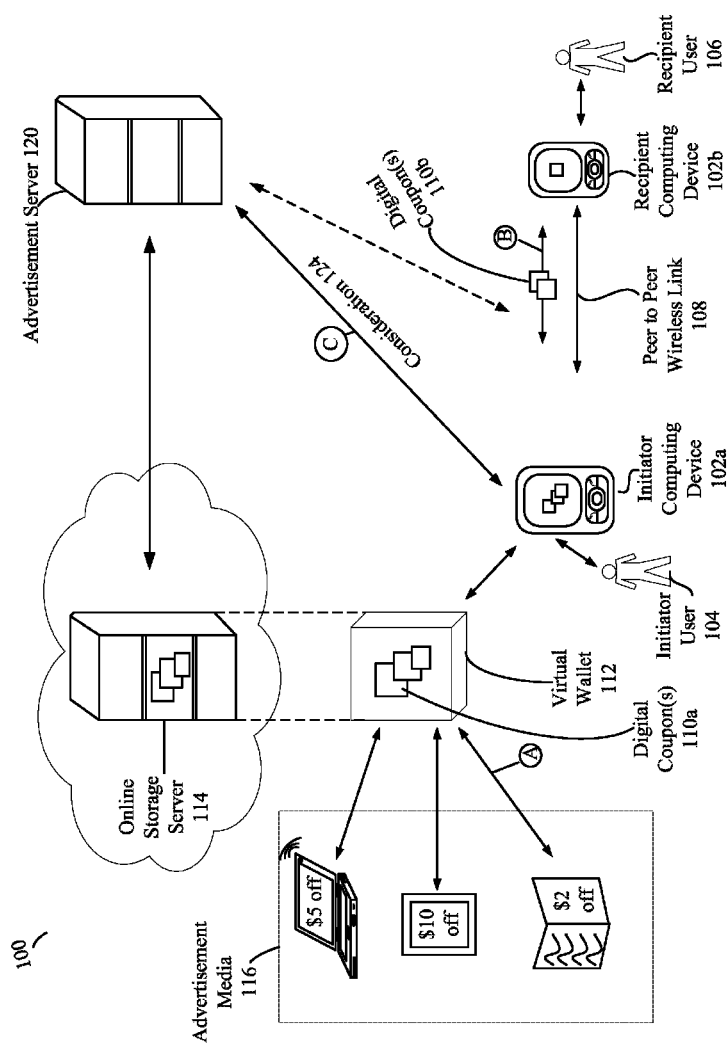
FIGS. 1A-1B (collectively FIG. 1) illustrates a system for value regulation based advertising, according to one or more exemplary embodiments.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements throughout the several views. Other features of the present embodiments will be apparent from the Detailed Description that follows.

DETAILED DESCRIPTION

Disclosed are a system, a method and an apparatus for value regulation based advertising. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

The term "digital coupon" as used herein can generally refer to any appropriate digital embodiment of a promotion. The promotion can include, but is not limited to a coupon. The digital coupon can be receivable and transferable using a machine. Further, the digital coupon can be machine readable. In one embodiment, a paper coupon may be may be acquired, transported to a digital media and/or converted to a digital coupon.

The term "value of the digital coupon" as used herein can generally refer to any appropriate characteristics of the digital coupon. For example, a worth of the digital coupon such as a discount, a deal, an offer, a rebate, an experience (e.g., a free test drive), a point, an information (e.g., new information associated with the digital coupon), etc. The worth may be monetary and/or non-monetary. To mention a few examples of the characteristics of the digital coupon that may be considered as the value of the digital coupon, without being exhaustive, the value of the digital coupon may include a redemption limit of the digital coupon, an expiration date of the digital coupon, a redemption period of the digital coupon, a product associated with the digital coupon, a store associated with the digital coupon, a department in the store associated with the digital coupon and/or a product category associated with the digital coupon.

In an example embodiment, changing a value of the digital coupon may include changing the redemption limits of the digital coupon (e.g. change from one coupon per purchase to two coupons per purchase), changing the expiration date of the digital coupon, changing the redemption period of the digital coupon (e.g., change from only redeemable on weekends to redeemable on all days, change from redeemable after 6 pm to redeemable after 4 pm), changing the store locations (e.g. change from 10% at SF locations only to 10% off all stores in CA), changing the store departments (e.g. change from women's department only to all departments), changing the products associated with the digital coupon (e.g. change from applies to non-sale items only to applies to all items including sale items), and/or changing product categories associated with the digital coupon (e.g., change from 15% off 12 oz drinks to 15% off 12 oz & 16 oz drinks).

The term "computing device" as used herein can generally refer to any appropriate data processing device. In one embodiment, the computing device may be a portable/mobile data processing device. In one embodiment, the initiator computing device 102a (shown in FIG. 1) and the recipient computing device 102b (shown in FIG. 1) may be a mobile computing device, (e.g., notebook computer, tablet computer, netbook computer, e-Reader, or personal digital assistant (PDA), video game device, GPS locator device, cellular telephone, smartphone, or other mobile device). In one embodiment, the initiator computing device 102a and the recipient computing device 102b may be, inter alia Near Field Communication (NFC) enabled or can be coupled to an NFC enabled device. In another embodiment, the initiator computing device 102a and the recipient computing device 102b may be a desktop personal computer.

FIG. 1A illustrates a system for value regulation based advertising, according to one or more exemplary embodiments. In particular, FIG. 1A illustrates an initiator computing device 102a associated with an initiator user 104, a recipient computing device 102b associated with a recipient user 106, a virtual wallet 112, an online storage server 114, an advertisement server 120, digital coupon(s) 110a and 110b, a peer to peer wireless link 108 and an advertisement media 116.

In one embodiment the initiator computing device 102a is configured to acquire a digital coupon 110a from an advertisement media 116. Further, the initiator computing device 102a can share (e.g., transfer) the digital coupon 110a with the recipient computing device 102b. The initiator computing device 102a can receive a consideration from the advertisement server 120 responsive to sharing the digital coupon with the recipient computing device 102b. In addition, the initiator computing device 102a is configured to facilitate changing a value of the digital coupon that is shared with the recipient mobile computing device 102b.

In an exemplary embodiment, operation 'A' in FIG. 1A illustrates the initiator computing device 102a acquiring a digital coupon 110a from the advertisement media 116. The digital coupon 110a may be associated with a merchant (e.g., Starbucks®, American Eagle®, etc.). Further, the merchant may market the digital coupon 110a using the advertisement media 116. In one embodiment, the advertisement media 116 may be online media such as Internet based advertisement media (e.g., merchant website, third party website, etc.). In another embodiment, the advertisement media may be an offline media such as smart billboards, print media, television, etc.

In an example embodiment, where the advertisement media is an online media, the initiator user 104 can connect to the Internet using the initiator computing device 102a to acquire the digital coupon (e.g., using clickable links, automatic downloading, etc). The coupon may be hosted on a merchant website and/or a third party website. In one embodiment, acquiring the digital coupon can include downloading the digital coupon onto the initiator computing device 102a and/or saving the digital coupon on the virtual wallet. In another example embodiment, where the advertisement media is an offline media, the initiator user 104 can acquire the digital coupon 110a via an email, receiving the coupon as a multimedia message, capturing an image of the digital coupon 110a (e.g., a machine readable coupon) on a print media, or scanning and saving he digital coupon using the initiator computing device 102a. In one embodiment the digital coupon 110a can be acquired via an NFC based technology. In some embodiments, the initiator computing device 102a can be used to acquire the digital coupon 110a by, for example, presenting the initiator computing device 102a at a register, point of sale, or service desk within a store.

In one embodiment, the initiator computing device 102a is configured to store the digital coupon in a virtual wallet 112 associated with the initiator user 104, responsive to acquiring the digital coupon 110a. An initiator user 104 and/or recipient user 106 can have one or more virtual wallets. The virtual wallet 112 may be implemented as a software application that can reside on the initiator computing device 102a. The virtual wallet 112 can be representative of an online storage server 114 in a cloud network. The initiator computing device 102a is configured to store the digital coupon 110a in the online storage server 114. In one embodiment, the online storage server 114 can store digital coupons from one or more virtual wallets. Further, the online storage server can manage (or organize) the one or more virtual wallets and/or more digital coupons in each virtual wallet.

In one embodiment, the initiator user 104 can access the digital coupon 110a from the online storage server 114 at any location and/or time, using the initiator computing device 102a. In another embodiment, the initiator user 104 may access the digital coupon 110a from the online storage server 114 at any location and/or time, using any appropriate computing device. The virtual wallet application 112 can present a user interface to the initiator user 104 using a display of the initiator computing device 102a, to access the online storage server 114. In one embodiment, once the digital coupon 110a is stored in the initiator user's virtual wallet 112, the initiator user 104 can choose to share the digital coupon 110a with one or more other users. In another embodiment, the initiator user 102a can choose to redeem the digital coupon 110a. The initiator user 104 can redeem the digital coupon 110a at a merchant's point-of-sale/point-of-service (POS) terminal and/or via a merchant's website. In an alternate embodiment, a user may redeem the digital coupon by calling a toll free number or a number specified by a merchant associated with the digital coupon. In yet another embodiment, the digital coupon may be redeemed by gestures.

In an exemplary embodiment, operation B in FIG. 1A illustrates the initiator computing device 102a sharing the digital coupon 110a with the recipient computing device 102b. In one embodiment, responsive to storing the digital coupon 110a in the initiator user's virtual wallet 112, the initiator computing device 102a can prompt the initiator user 104 to share the digital coupon 110a. The prompting may include, inter alia, requesting the initiator user 104 to share the digital coupon 110a, visually presenting a list of recipient users (e.g., a social network friend list, a contact list, etc.) to share the digital coupon 110a and/or visually presenting an incentive associated with sharing the digital coupon 110a. The initiator computing device 102a can prompt the initiator user 104 using an output peripheral (e.g., display screen, audio speakers, etc.) of the initiator computing device 102a. In one embodiment, the initiator user 104 can respond to the prompt by manually selecting an option on a user interface of the initiator computing device 102a, that causes the digital coupon 110a to be transferred to the recipient computing device 102b. In another embodiment, the initiator computing device 102a is configured to automatically transfer the digital coupon 110a to a predefined group of recipient users (e.g., social network friend list, contact list, etc.). In one embodiment, the initiator computing device 102a is configured to generate a list of recipient users to receive the digital coupon 110a, responsive to acquiring the digital coupon 110a.

Using the initiator computing device 102a, the initiator user 104 can share the digital coupon 110a with a recipient user 106. The initiator computing device 102a is configured to transfer the digital coupon 110a to the recipient computing device 102b. Sharing may be broadly interpreted as transferring and/or transmitting the digital coupon from one device to another device. In one embodiment, a copy of the digital coupon 110a may be transmitted, leaving the acquired digital coupon 110a in virtual wallet 112 of the initiator user 104. In another embodiment, a copy of the digital coupon 110a may be stored in the virtual wallet 112 of the initiator user 104 and the acquired digital coupon 110a may be transmitted.

In one embodiment, transmitting a digital coupon between computing devices may refer to transferring the digital coupons between the virtual wallets of the users associated with the virtual wallets. The computing devices may facilitate the transfer of the digital coupon between the virtual wallets.

In one embodiment, the initiator computing device 102a can transfer the digital coupon 110a to the recipient computing device 102b over a peer to peer wireless link 108. The peer to peer wireless communication link is established between the initiator computing device 102a and the recipient computing device 102b. In one embodiment, the digital coupon 110a may be shared over a peer to peer wireless communication link 108 using an NFC protocol. The peer to peer wireless communication link 108 can be an NFC link. In another embodiment, the peer to peer wireless communication link 108 can be inter alia, an RFID link, a Bluetooth link and/or an infrared link. In one embodiment, the initiator computing device 102a can transmit the digital coupon 110a to the recipient computing device 102b through sending an SMS, MMS, e-mail, etc.

In an example embodiment, the peer to peer wireless communication link 108 can be established based on a motion pattern of the initiator computing device 102a and/or the recipient computing device 102b. For example, user A shares a coupon with user B by shaking phone A toward B, user A and user B moving the phones in opposing circles around one another, etc.

In one embodiment, the initiator computing device 102a can transmit the digital coupon 110a to the recipient computing device 102b over a contact based link. The contact based link can be a cloud based "Bump" like technology. The "Bump" technology uses the cloud to match the vibration recorded from a physical bump to another matching physical vibration in a phone nearby.

In another embodiment, the initiator computing device 102a can transfer the digital coupon 110a to the recipient computing device 102b via the advertisement server 120. In some embodiments, the initiator user 104 can leave the digital coupon 110a for the recipient user 106 at a POS terminal or at a merchant website. The digital coupon 110a can be stored in a database associated with the POS terminal. The digital coupon 110a can comprise, inter alia an identifier associated with the recipient computing device 102b and an identifier associated with the initiator computing device 102a. When the recipient computing device 102b registers with and/or checks in, using the identifier associated with the recipient computing device 102b, at the POS terminal, the digital coupon 110a can be transferred from the POS terminal to the recipient computing device 102b.

In yet another embodiment, a user may leave a digital coupon in a cloud storage device by tapping his computing device at an appropriate $3^{rd}$ party location (e.g., smart billboard). The third party location may be associated with the cloud storage. For example, a user may tap a billboard displaying company X's product with his phone and leave a coupon for his friend or stranger to pick it up. The billboard may be associated with a third party such as an advertising agency.

Figure 1B:
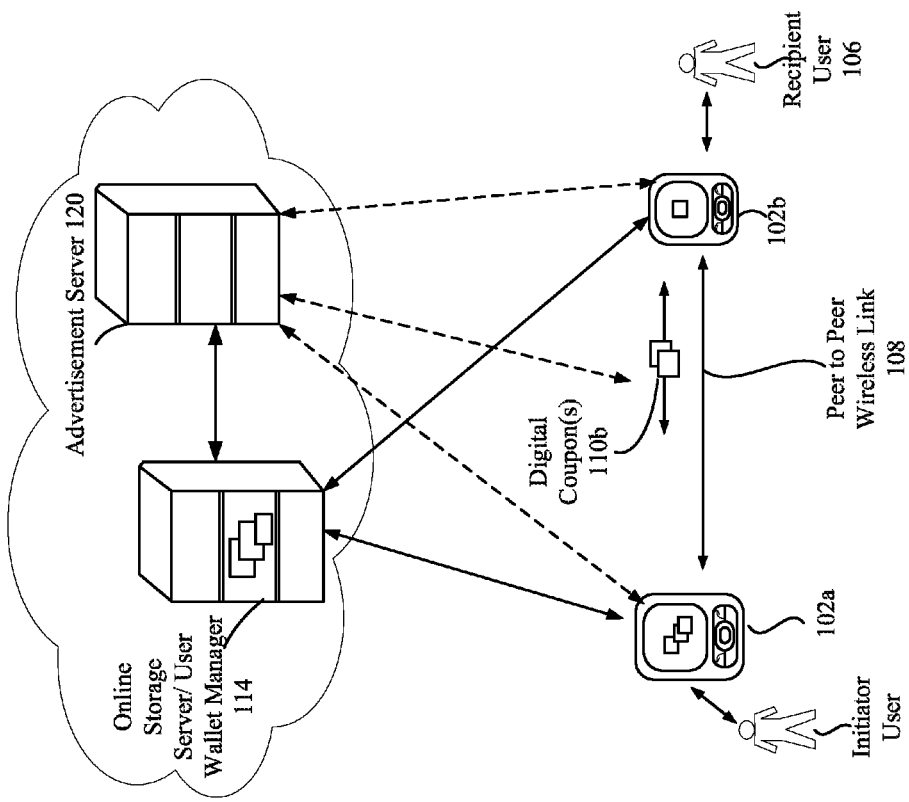

In one embodiment, the advertisement server 120 can be a cloud based server 120 as illustrated in FIG. 1B. Further, the advertisement server 120 can interact with the online storage server 114, the initiator computing device 102a, and/or the recipient computing device 102b as illustrated in FIG. 1B.

In the exemplary embodiment of FIG. 1A, the initiator computing device 102a acquires a digital coupon 110a having a first value. In one embodiment, the initiator computing device can initiate a change in the value of the digital coupon 110a before sharing it with the recipient computing device 102b. The value of the digital coupon can be changed to have a second value. Then, the initiator computing device 102a can transmit the digital coupon 110b with a second value to the recipient computing device 102b. The recipient computing device 102b can receive the digital coupon 110b with the second value. In another embodiment, the initiator computing device 102a can transmit the digital coupon 110a having the first value and when recipient user 106 redeems the digital coupon using the recipient computing device 102b at a merchant's point-of-sale/point-of-service (POS) terminal or via a merchant's website, the digital coupon can be assigned a second value. In one embodiment, the value of the digital coupon 110a can change once it is received by the recipient computing device 102b.

In one embodiment, the first value and the second value of the digital coupon can be same. In another embodiment, the first value and the second value of the digital coupon can be different. The merchant associated with the digital coupon can control the change in the value of the coupon based on a set of predetermined criterion. The set of predetermined criterion is described in greater detail below, in connection with FIG. 4 and FIG. 5.

In one embodiment, the advertisement server 120 is configured to change the value of the digital coupon 110a. In another embodiment, the initiator computing device 102a can change the value of the digital coupon 110a. Further, in some embodiments, the recipient computing device 102b can change the value of the digital coupon 110a. Changing the value of the digital coupon is described in greater detail below, in connection with FIG. 4 and FIG. 5.

Figure 4:
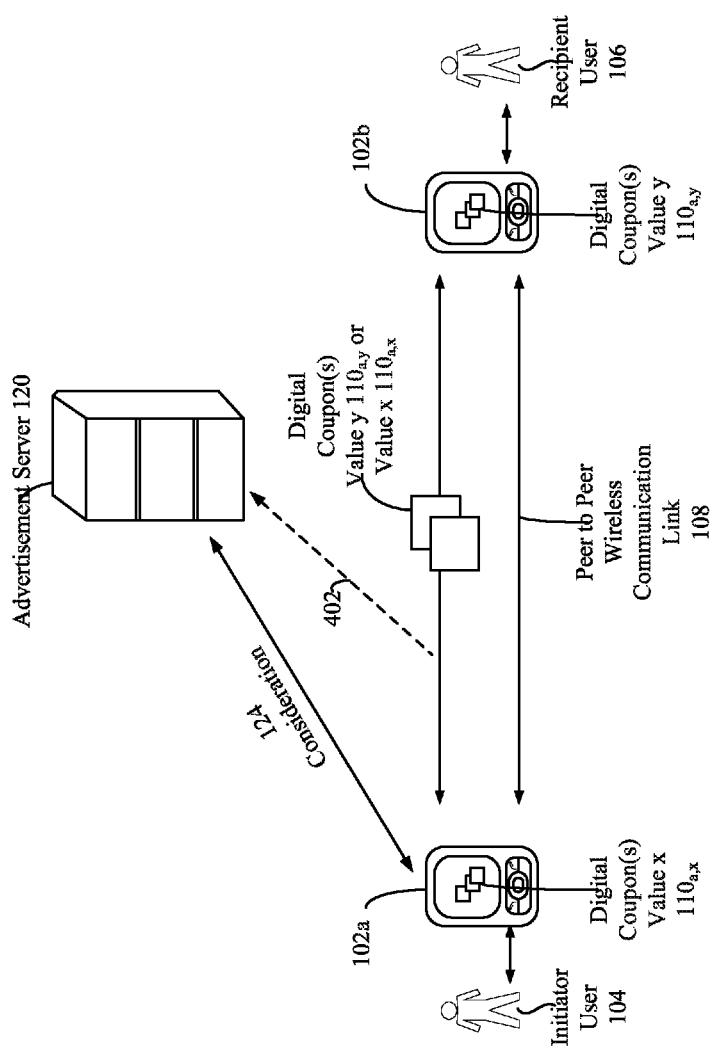
FIG. 4 illustrates a system for changing the value of the digital coupon upon sharing the digital coupon, according to one or more exemplary embodiments.

Now refer to FIG. 1 and FIG. 4. FIG. 4 illustrates a system for changing the value of the digital coupon upon sharing the digital coupon, according to one or more exemplary embodiments. In particular, FIG. 4 illustrates an initiator user 104, an initiator computing device 102a, a recipient user 106, a recipient computing device 102b, an advertisement server 120, a share signal 402, a consideration 404, a peer to peer wireless communication link 108, a digital coupon having a first value 110a,x and a digital coupon having a second value 110a,y.

In an exemplary embodiment, using the initiator computing device 102a, the initiator user 104 can share the digital coupon 110a,x having a first value, with the recipient user 106. In the exemplary embodiment of FIG. 4, the value of the digital coupon is changed before it is transmitted from the initiator computing device 102a to the recipient computing device 102b. The digital coupon 110a,x may have a first value and the digital coupon 110a,y may have a second value. The digital coupon 110a,x having the first value and the digital coupon 110a,y having the second value may be associated with the same merchant.

In another embodiment, the initiator user 104 can acquire the digital coupon 110a,x having a first value. Using the initiator computing device 102a, the initiator user 104 can transmit the digital coupon 110a,x to the recipient computing device 102b over the peer to peer wireless communication link 108. The recipient computing device 102b can receive the digital coupon 110a,x having the first value. The value of the digital coupon 110a,x can be changed to have a second value (e.g., digital coupon 110a,y), once the recipient computing device 102b receives the digital coupon 110a,x having the first value.

In yet another embodiment, the initiator user 104 can acquire the digital coupon 110a,x having a first value. Using the initiator computing device 102a, the initiator user 104 can transmit the digital coupon 110a,x to the recipient computing device 102b over the peer to peer wireless communication link 108. The recipient computing device 102b can receive the digital coupon 110a,x having the first value. When the recipient user chooses to redeem the digital coupon 110a,x at a merchant's point-of-sale/point-of-service (POS) terminal or via a merchant's website, the value of the digital coupon 110a may be changed to have a second value (e.g., digital coupon 110a,y). In one embodiment, the merchant's point-of-sale/point-of-service (POS) terminal or via the merchant's website can be logically coupled to the advertisement server 120. Using the advertisement server 120, the value of the digital coupon 110a,x having a first value can be changed to have a second value. In the exemplary embodiment, 'x'(in 110a,x) may refer to the first value and 'y' (in 110a,y) may refer to the second value. In another embodiment, the merchant's point-of-sale/point-of-service (POS) terminal or via the merchant's website can be logically coupled to a merchant specific server which is configured to change the value of the digital coupon. In one embodiment, the advertisement server 120 may be merchant controlled and/or third party controlled (e.g., advertisement agencies).

In an exemplary embodiment, the initiator computing device 102a is configured to transmit a share signal 402 to the advertisement server 120 after the initiator computing device 102a has shared the digital coupon having a first value 110a,x with the recipient computing device 102b (i.e., When the initiator computing device 102a receives an acknowledgment from the recipient computing device 102b that digital coupon having a first value has been received by the recipient computing device 102b). The share signal 402 can indicate that the digital coupon 110a,x having a first value, is shared by the initiator computing device 102a with the recipient computing device 102b. In an alternate embodiment, the initiator computing device 102a can transmit a notify signal (not shown in FIG. 4) to the advertisement server 120 before the digital coupon 110a,x is shared with the recipient computing device 102b. The notify signal can indicate an intent of the initiator computing device 102a to share the digital coupon with the recipient computing device 102b (e.g., Initiator user 104 is prompted using the initiator computing device 102a using a user interface of the initiator computing device 102a, "Do you want to share the coupon?". When the initiator user 104 clicks/chooses the option that indicates that the initiator user 104 intends to share the coupon, the initiator computing device 102a transmits a notify signal to the advertisement server 120.)

In one embodiment, the advertisement server 120 can have a copy of the digital coupon 110a,x and the value of the digital coupon 110a,x (e.g., first value) that is acquired using the initiator computing device 102a. In another embodiment, the initiator computing device 102a can transmit a copy of the digital coupon 110a,x to the advertisement server 120. In one embodiment, the initiator computing device 102a can inform the advertisement server 120 when a digital coupon 110a,x is acquired. In another embodiment, the online storage server 114 (virtual wallet 112 associated with the initiator user shown in FIG. 1) can inform the advertisement server 120 when the initiator computing device 102a acquires the digital coupon 110a,x. In some embodiments, the advertisement server 120 may periodically scan the online storage server 114 to update information when a digital coupon 110a,x is acquired using the initiator computing device 102a. In a further embodiment, transmitting the copy of the digital coupon may refer to transmitting identifiers associated with the coupon.

In another exemplary embodiment, the recipient computing device 102b can transmit the share signal 402 to the advertisement server 120. In this embodiment, the initiator computing device 102a can transmit the digital coupon 110a,x having a first value to the recipient computing device 102b (e.g., over peer to peer wireless link, via advertisement server 120, etc.) The recipient computing device 102b can receive the digital coupon 110a,x having the first value. Upon receiving the digital coupon 110a,x having the first value, the recipient computing device 102b can transmit a share signal 402 to the advertisement server 120 indicating that the initiator computing device 102a has shared the digital coupon with the recipient computing device 102b.

In one embodiment, the advertisement server 102 receives the share signal 402. Upon receiving the share signal 402, the advertisement server 120 is configured to determine a second value associated with the digital coupon 110a. The advertisement server 120 can determine the second value associated with the digital coupon based on a number of predetermined criterion. In one embodiment, the predetermined criterion can be a number of times the digital coupon is shared. In another embodiment, the predetermined criterion can be a degree of separation between the initiator user 104 and the recipient user 106. The degree of separation is explained in greater detail below, in association with FIG. 5. Further, the predetermined criteria can include other factors such time of the day at which the digital coupon is shared, the kind of digital coupon that is shared, etc. In one embodiment, the value of the digital coupon may be changed based on the peer to peer communication link used to share the digital coupon (e.g., if the digital coupon is shared over NFC, the second value may be higher than first value.)

In one embodiment, the advertisement server 120 can assign the second value to the digital coupon when the recipient computing device 102b receives the digital coupon.

In one embodiment, the advertisement server 120 can transmit the second value of the digital coupon to the online storage server 114. The online storage server 114 may receive the second value and update a value of the coupon stored in the virtual wallet of the recipient user 106. The second value can be transmitted in the form of a signal encoded with the second value. When the digital coupon is displayed to the recipient user 106 using the recipient computing device 102b, the second value may be presented to the recipient user 106 (i.e., the recipient user may be unaware that the value of the digital coupon has been changed and further the recipient user may be unaware of the first value of the digital coupon. Only the changed value may be presented to the recipient user). In another embodiment, the advertisement server 120 can assign the second value to the digital coupon when the recipient user 106 redeems the digital coupon at the merchant's point-of-sale/point-of-service (POS) terminal or via the merchant's website. The second value of the digital coupon may remain unknown to the recipient user 106, till the recipient user redeems the digital coupon at the merchant's point-of-sale/point-of-service (POS) terminal or via the merchant's website.

In another embodiment of FIG. 4, the initiator computing device 102a can share the digital coupon with the recipient computing device 102b through the advertisement server 120. In this embodiment, the initiator computing device 102a can send the digital coupon, having the first value, 110a,x to the advertisement server 120. The advertisement server 120 can change the value of the digital coupon to have a second value, based on the number of predetermined criterion. The advertisement server 120 can transmit the digital coupon, having the second value, 110a,y to the recipient computing device 102b. The recipient computing device 102b can receive the digital coupon 110a,y having the second value.

The process of changing the value of the digital coupon may be hidden from the recipient user 106 and/or the initiator user 104. For example, when the initiator user 104 transmits the coupon, it appears to the initiator user 104 that the initiator user 104 is transmitting a digital coupon with value x to the recipient user, and when the recipient user 106 receives the coupon, it appears to the recipient user 106 that the initiator user shared a coupon having a value y. The recipient user may not know that the initiator user shared the coupon having value x and that it was changed to have a value y. In another embodiment, the users may be aware of the changing value of the digital coupon.

As mentioned earlier, the change in the value of the digital coupon can depend on a number of predetermined criterion. The number of predetermined criterion may be pre-defined by a merchant associated with the digital coupon. In one embodiment, the predetermined criterion can be predefined and/or controlled by a third party. In a further embodiment, the predetermined criterion can be merchant defined and user controlled.

In one embodiment, the first value of the digital coupon can be same as the second value (e.g., The promotion acquired by user 1 is shared to user 2, 3 . . . n and the value remains the same). In another embodiment, the first value and the second value can be different. In one embodiment, the first value can be greater than the second value (e.g., The more degrees of separation, the more the promotional value decreases. For example, User 1 gets 20% off, User 2: 15%, User 3: 10%, etc.) In one embodiment, the first value can be lesser than the second value (e.g., If User 1 distributes the offer to 2 people (Users 2 and 3), the value of their offer increases from 20% to 22% off, and if distributed to 4 people- to 24% off. If User 2 distributes to two more people, both User 2 and User 1 receive additional benefit.). In one embodiment, the value of the digital coupon can change randomly in that, the change may not follow any specific pattern (e.g., With each share, the recipient of the coupon receives a pre-set value at random. For example, a user could acquire $1, $5, $10, or $20 off from their friend (e.g. via NFC coupon share) and the value is unknown.)

In one embodiment, the initiator computing device 102a can send a notify signal to the advertisement server 120. The notify signal can inform the advertisement server that the initiator computing device 102a wants to share the digital coupon having a first value 110a,x with the recipient computing device 102b. The advertisement server 120 can determine the second value associated with the digital coupon based on the number of predetermined criterion. The advertisement server 120 can assign the second value to the digital coupon. In one embodiment, the advertisement server 120 can send the digital coupon 110a,y having the second value to the initiator computing device 102a. Further, the initiator computing device 102a can transmit the digital coupon 110a,y having the second value to the recipient computing device 102b. The recipient computing device 102b can receive the digital coupon 102b having the second value and store it in the virtual wallet associated with the recipient user 106. The digital coupon having the second value 110a,y can be transmitted to the recipient computing device 102b over a peer to peer wireless communication link 108 and/or via the advertisement server 120.

In an alternate embodiment, the advertisement server 120 can send the second value to the initiator computing device 102a. The initiator computing device 102a can change the value of the digital coupon. The processor of the initiator computing device can execute a set of instructions that is configured to change the value of the digital coupon locally. The initiator computing device 102a can access the number of predetermined criterion from the advertisement server 120. Further, the initiator computing device 102a can transmit the digital coupon 110a,y having the second value to the recipient computing device 102b. In yet another embodiment, the initiator computing device 102a can transmit the digital coupon having the first value to the recipient computing device 102b. The recipient computing device 102b is configured to change the value of the digital coupon locally using a processor of the recipient computing device 102b and accessing the second value from the advertisement server 120.

In one embodiment, logging information may be encoded in the digital coupon that is transmitted from the initiator computing device 102a to the recipient computing device 102b. In one embodiment, the logging information may include, inter alia a user identifier for the virtual wallet in which the digital coupon is stored, a coupon identifier, an offer identifier and a status identifier. The user identifier may identify a user that shares the digital coupon and/or receives the digital coupon. The user identifier may be unique to a user. The status identifier may identify the number of times the digital coupon has been shared and the degree of separation between the initiator user 104 and the recipient user 106. The coupon identifier may identify an association of the digital coupon with the user and the merchant and the offer identifier may identify the value associated with the digital coupon.

Figure 6:
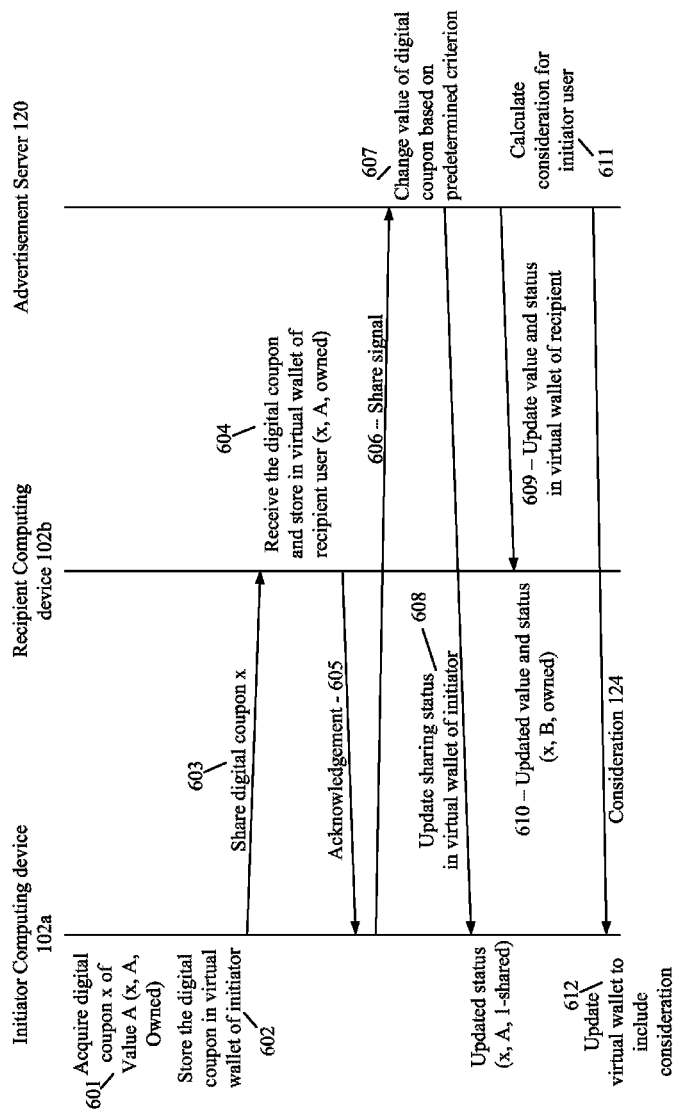
FIG. 6 illustrates a method for value regulation based advertising, according to one or more example embodiments.

In one embodiment, each time the coupon is shared, the logging information gets appended to the digital coupon. In one embodiment, the merchant may retrieve the history of all the transactions associated with the specific digital coupon 110a when a recipient user redeems the digital coupon at the merchant's point-of-sale/point-of-service (POS) terminal or via the merchant's website. In another embodiment, the logging information can be updated at the advertisement server 120, each time the digital coupon is shared. The advertisement server 120 can present a user interface to the merchant (or to a third party) to view an influence of a user in spreading the digital coupon and to determine an effective way of marketing a promotion. In one embodiment, the advertisement server 120 can provide an analysis chart based on the transaction history of the digital coupon. In another embodiment, the initiator user 104 and/or the recipient user 106 can store a trail of the digital coupon using the user interface of the initiators computing device 102a and the recipients computing device 102b respectively. The advertisement server 120 may transmit the trail of the digital coupon 110a,x to the initiator computing device 102a and/or the recipient computing device 102b upon request. In another embodiment, the initiator computing device 102a and/or the recipient computing device 102b can save a content of the coupon which can be exchanged among each other and aggregated to determine a trail of the digital coupon 110a,x. In one embodiment, the trail of the digital coupon can be presented visually using the user interface. The logging of the digital coupon is described in greater detail below, in connection with FIG. 6.

In one embodiment, each time an initiator user 104 shares a digital coupon with a recipient user 106, the initiator user 104 is provided with a consideration 404 from the merchant (e.g., American Eagle, Inc. for an American Eagle coupon, Starbucks, Inc. for a Starbucks coupon, etc.) associated with the digital coupon. The process of providing a consideration to the initiator user 104 is described in greater detail below, in connection with FIG. 1A.

Now refer back to FIG. 1A. In one embodiment, operation C illustrates the initiator computing device 102a receiving a consideration from the advertisement server 120. In one embodiment, each time an initiator computing device 102a shares a digital coupon 110a or 110b with a recipient, the initiator computing device 102a can receive a consideration from the merchant (e.g., American Eagle, Inc. for an American Eagle coupon, Starbucks, Inc. for a Starbucks coupon, etc.) associated with the digital coupon. In one embodiment, the advertisement server 120 can provide the consideration to the initiator computing device 102a. The value of the consideration provided to the initiator computing device 102a can increase if the recipient user 106 redeems the digital coupon, i.e., purchases a product associated with the merchant and exchanges the coupon for a financial discount or rebate on the purchase thereof. The consideration provided to the initiator computing device 102a may be in the form of cash back, addition discounts, loyalty points, etc. In one embodiment, the initiator computing device 102a can receive additional digital coupons when the initiator computing device 102a shares the digital coupon 110a with the recipient computing device 102b. The consideration provided to the initiator computing device 102a can be proportional to the value of the digital coupon 110a that is being shared and/or redeemed (110b). The merchant associated with the coupon may determine the value of the consideration to be provided to the sharer. In one embodiment, the value may be preset. In another embodiment, the value of the consideration may be variable and/or calculated real-time.

In one embodiment, the recipient computing device 102a can share the digital coupon 110b with another user (e.g., second recipient computing device 102c (shown in FIG. 5)). When, the recipient computing device 102b shares the digital coupon 110b with another user, both the recipient computing device 102b and the initiator computing device 102a can receive a consideration. The consideration that the initiator computing device 102a receives when the recipient computing device 102b shares the digital coupon 110b with another user can be additional to the consideration received when the initiator computing device 102a shares the digital coupon 110a with the recipient computing device 102b. Sharing of the digital coupon 110b by the recipient computing device 102b is discussed in greater detail in association with FIG. 5.

Figure 5:
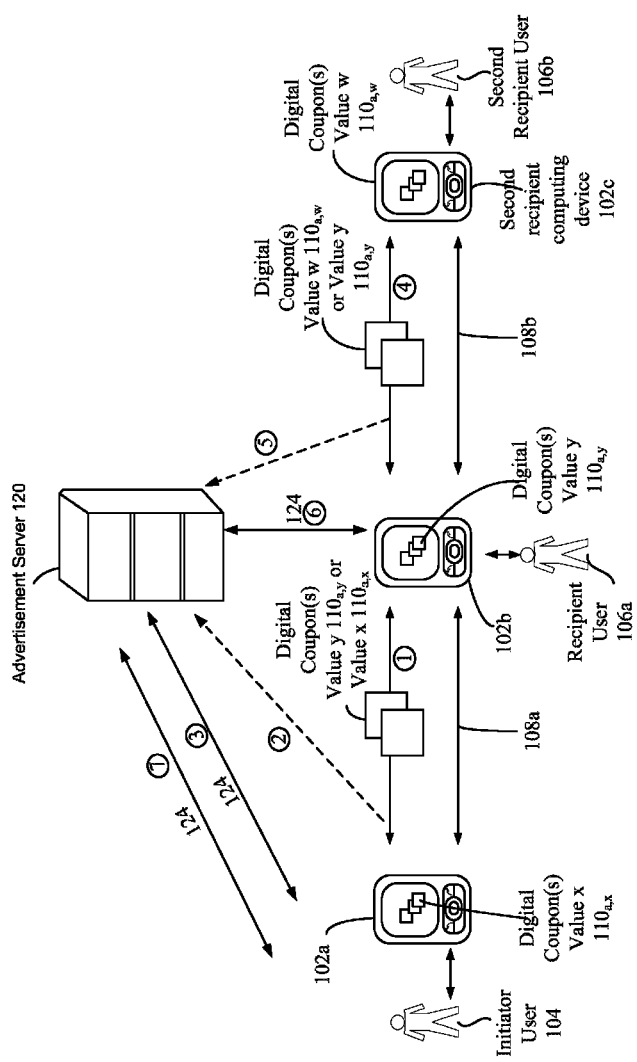
FIG. 5 illustrates sharing a digital coupon by the recipient computing device, according to one or more exemplary embodiments.

Referring now to FIGS. 1A-1B and FIG. 5, FIG. 5 illustrates sharing a digital coupon by the recipient computing device, according to one or more exemplary embodiments. In particular, FIG. 5 illustrates an initiator user 104, an initiator computing device 102a, a recipient user 106a, a recipient computing device 102b, a second recipient user 106b, a second recipient computing device 102c, a peer to peer wireless communication link 108a and 108b, a digital coupon 110a,x, a digital coupon 110a,y, a digital coupon 110a,w, and an advertisement server 120.

In operation 1 of FIG. 5, the initiator computing device 102a can transmit a digital coupon 110a having a first value 'x' (e.g., 110a,x) with a recipient computing device 102b over a peer to peer wireless communication link 108a as discussed in FIG. 4. In an example embodiment of FIG. 5, the shared digital coupon can have value 'x' (110a,x) as acquired by the initiator computing device 102a, or a value 'y' (110a,y) if the value has been changed before sharing. In operation 2 of FIG. 5, the initiator computing device 102a can transmit a share signal 402 to the advertisement server 120. The advertisement server 120 can determine and assign the second value 'y' to the digital coupon 110a when the recipient computing device 102b receives the digital coupon transmitted by the initiator computing device 102a. The second value 'y' can be determined based on a set of predetermined criterion than includes a degree of separation between the initiator computing device 102a and the recipient computing device 102b. In the example embodiment of FIG. 5, the degree of separation is 1 between the initiator user 104 associated with the initiator computing device 102a and the recipient user 106a associated with the recipient computing device 102b. The second value 'y' can also depend on the number of times the digital coupon 110a is shared. In another embodiment, operation 1 of FIG. 5 can include transmitting a notify signal to the advertisement server 120 after which the digital coupon 110a can be shared with the recipient computing device 102b with either a value 'x' (e.g., 110a,x) or a value 'y' (e.g., 110a,y). In operation 3 of FIG. 5, the initiator computing device 102a can receive a consideration from the advertisement server 120 on sharing the digital coupon 110a with the recipient computing device 102b. In one embodiment, the value of the consideration can be higher when the recipient computing device 102b redeems the digital coupon having a second value (110a,y). For example, the initiator computing device 102a receives a $5 rebate (consideration) for sharing the digital coupon 110a with the recipient computing device 102b, but if the digital coupon 110a is redeemed by the recipient computing device 102b, the initiator computing device 102a receives a $15 rebate (consideration).

Further, in operation 4 of FIG. 5, the recipient computing device 102b can transmit the digital coupon 110a having a second value 'y' with a second recipient computing device 102c over a peer to peer wireless communication link 108b. In one embodiment, operation 4 can include sending a notify signal to the advertisement server 120, receiving and assigning a third value 'w' to the digital coupon 110a before transmitting it to the second recipient computing device 102c. In another embodiment, in operation 5 of FIG. 5, the recipient computing device 102b can transmit a re-share signal to the advertisement server 120. The re-share signal can indicate that the digital coupon 110a acquired by the initiator computing device 102a, which was received by the recipient computing device 102b with a second value 'y' (110a,y), is being shared by the recipient computing device 102b with a second recipient computing device 102c. On receiving the re-share signal, the advertisement server 120 can calculate a third value 'w' of the digital coupon 110a. Further, the third value can be assigned to the digital coupon 110a when the second recipient computing device 102c receives the digital coupon 110a. The third value of the digital coupon can be calculated based on a degree of separation between the initiator user 104 and the second recipient user 106b and the number of times the digital coupon 110a is shared. In the example embodiment of FIG. 5, the degree of separation between the initiator user 104 and the second recipient user 106b is 2. Further the digital coupon 110a is shared 2 times. In operation 6 of FIG. 5, the recipient computing device 102b can receive a consideration for sharing the digital coupon 110a with the second initiator computing device 102c. Further, in operation 7 of FIG. 5, the initiator computing device 102a can receive a consideration when the recipient computing device 102b shares the digital coupon 110a with the second recipient computing device 102c. The value of the consideration may change if the second recipient user 106b redeems the digital coupon 110a,w. Further, the second recipient computing device 102c can transmit the digital coupon 110a having a third value 'w' (e.g., 110a,w) with a third recipient computing device and so on.

In one embodiment, the first value 'x', second value 'y' and the third value 'w' may be the same. In another embodiment, the first value 'x', second value 'y' and the third value 'w' may be different. In one embodiment, the considerations can be provided by the advertisement server 120. The share signal 402, re-share signal and/or the notify signal transmitted to the advertisement server 120 can include logging information. The advertisement server 120 can use the logging information to inter alia determine a trail of the digital coupon 110a, determine the value of the digital coupon 110a and further to determine users that may receive the consideration for sharing the digital coupon 110a. The advertisement server 120 and the computing device 102 is described in greater detail in association with FIG. 2 and FIG. 3.

Figure 2:
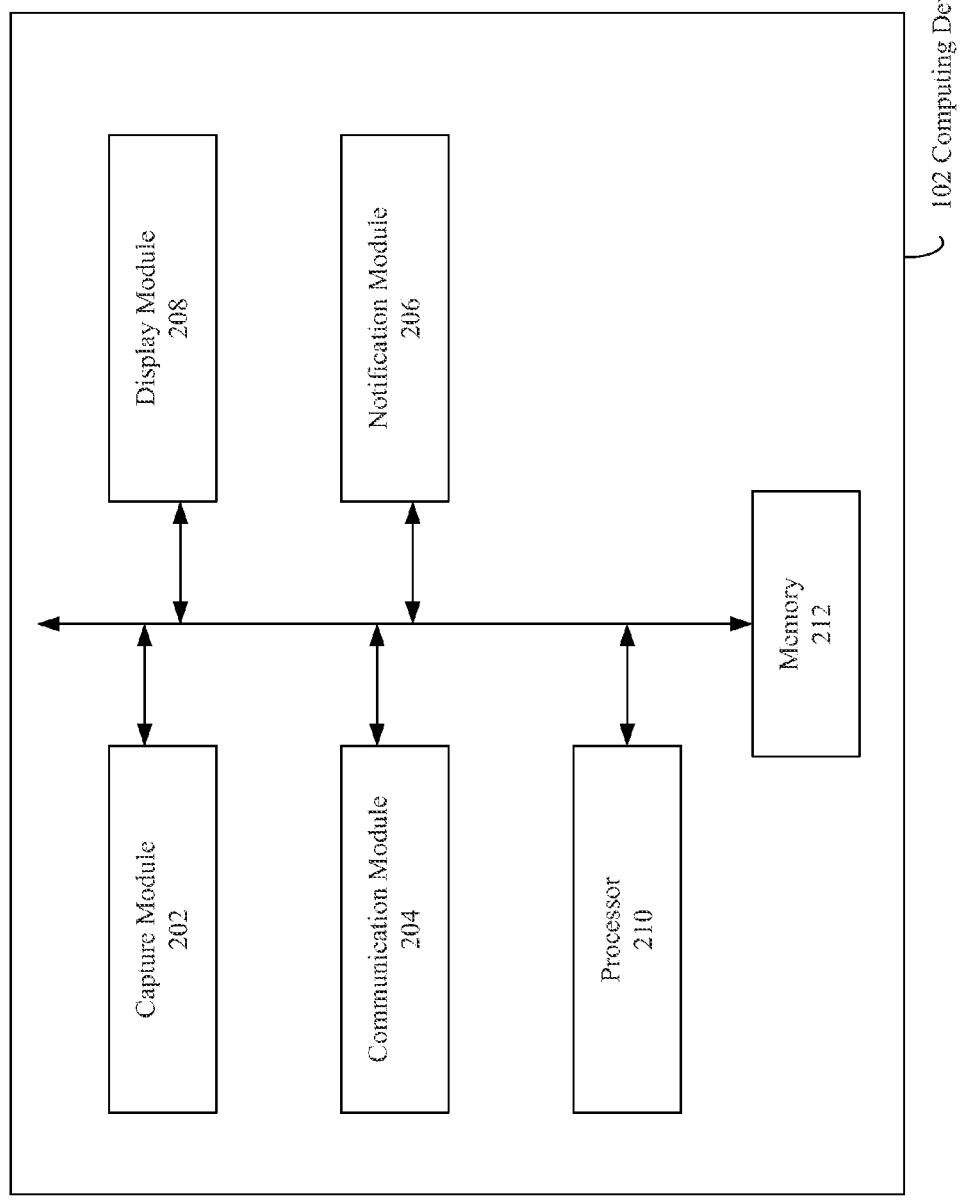
FIG. 2 illustrates a block diagram of the computing device of FIGS. 1A-1B, according to one or more exemplary embodiments.

Referring now to FIGS. 1A-1B and FIG. 2, FIG. 2 illustrates a block diagram of the computing device of FIG. 1A and FIG. 1B, according to one or more exemplary embodiments. Computing device can refer to initiator computing device 102a and recipient computing device 102b. In particular, FIG. 2 illustrates a capture module 202, a communication module 204, a notification module 206, a display module 208, a processor 210 and a memory 212.

In one embodiment, the capture module 202 is configured to acquire the digital coupon 110a from the advertisement media 116. The capture module 202 can include sensors that facilitate acquiring the digital coupon by capturing an image (e.g., image of digital coupon), scanning the image, downloading the digital coupon 110a and/or capture a digital coupon embodied as a sound (e.g., using microphone sensor). In one embodiment, the capture module is configured to download the digital coupon based on a location of the computing device and/or a time of the day. For example, if the computing device (e.g., initiator computing device 102a) is near store XYZ, the computing device can automatically (or by manual interaction of user) download coupons associated with store XYZ. In another example, between 4 pm and 6 pm the computing device may download the digital coupon associated with store ABC and between 6 pm to 8 pm the computing device may download digital coupons associated with store XYZ.

The capture module is further configured to store the acquired digital coupon 110a in a virtual wallet (online storage server 114) associated with the user that acquires the digital coupon (e.g., initiator user 104) or the user that receives the digital coupon (e.g., recipient user 106).

In one embodiment, the communication module 204 is configured to receive the digital coupon 110a from another user (e.g., initiator user). The communication module 204 is further configured to transmit the digital coupon 110a to another user (e.g., from initiator computing device to recipient computing device). In a further embodiment, the communication module 204 is configured to function as a transceiver. The communication module 204 can handle any appropriate communication to and from the computing device 102. In one embodiment, the communication module 204 can facilitate establishing the peer to peer wireless communication link 108 to transmit the digital coupon.

The notification module 206 is configured to communicate share, re-share and/or notify signals to the advertisement server 120. Further, the notification module 206 can process information received from the advertisement server 120, such as changed value. In one embodiment, the notification module 206 can change the value of the digital coupon 110a before transmitting the digital coupon 110a.

The display module 208 can process any appropriate information and transform the information to a visual representation. Once the digital coupon 110a is acquired and/or received the display module 208 can facilitate prompting a user to share the digital coupon 110a. In one embodiment, when an initiator computing device 102a acquires a digital coupon or the recipient computing device 102b receives a digital coupon from the initiator computing device 102a, the display module 208 can generate a list of users with whom the initiator user 104 and/or the recipient user 106 may want to share the digital coupon. Further, the display module 208 can aggregate logging information and generate a visual representation of the digital coupon's 110a trail. The display module 208 can present the visual representations through a display component (not shown in Figure) of the computing device. A user may interact with the computing device 102 via a user interface. In a further embodiment, the display module 208 can process a user inputted information.

All the modules of the computing device 102 may be software that is stored on a memory 212 of the computing device 102. In an alternate embodiment, the memory 212 may be external to the computing device. The memory may be a non-transitory or a transitory memory. The software includes a set of instructions which can be executed by the processor 210 to perform operations of the computing device 102. The capture module 202, communication module 204, the notification module 205 and/or the display module 208 may be coupled to each other and to the processor 210 and memory 212.

Figure 3:
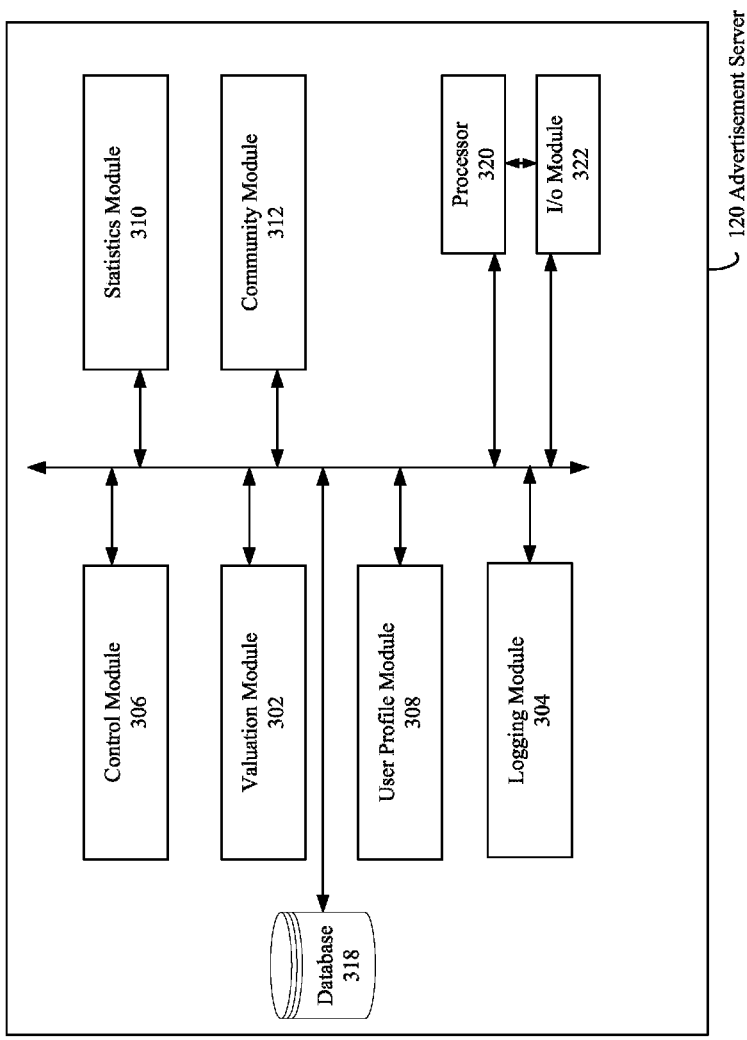
FIG. 3 illustrates a block diagram of the advertisement server, according to one or more exemplary embodiments.

Referring now to FIGS. 1A-1B and FIG. 3, FIG. 3 illustrates a block diagram of the advertisement server, according to one or more exemplary embodiments. In particular, FIG. 3 illustrates a valuation module 302, a logging module 304, a control module 306, a user profile module 308, a statistics module 310, a community module 312, a processor 320, an I/O module 322 and a database 318.

The I/O module 322 may be a hardware embodiment, a software embodiment or a combination of both. The I/O module 322 is configured to receive and/or transmit any appropriate communication associated with the advertisement server 120. The I/O module 322 can receive the information from the initiator computing device 102a and/or the recipient computing device 102b. The received information can be transmitted to the processor for further evaluation. In one embodiment, the processor 320 is configured to analyze the received information and call the respective modules to execute appropriate functions.

In one embodiment, the control module 306 is configured to determine a value of the digital coupon 110a. The I/O module 322 can receive a share signal, re-share signal and/or notify signal. On receiving the said signal, the control module 306 can determine a current value of the digital coupon. Further, the control module 306 can calculate the predetermined criterion based on the logging information associated with the digital coupon 110a, such as the number of times the digital coupon has been shared and the degree of separation. Once the predetermined criterion is calculated, the control module 306 can calculate the new value of the digital coupon 110a. In one embodiment, the new value may be the same as the current value. The new value can be determined using an algorithm that uses the current value and/or the predetermined criterion as input. The algorithm may be stored in and/or accessed from the database 318.

On receiving the notify, share and/or re-share signal, the logging module 304 can extract a logging information from the said signal, if the signal is embedded with the logging information. The logging module 304 can aggregate the logging information to determine a trail of the digital coupon and the associated users (e.g., initial user 104, recipient user 106a, second recipient user 106b, etc.) Further, the logging module 304 can communicate the logging information to the statistics module 310.

The statistics module 310 is configured to analyze the logging information and organize the logging information to a form that provides commercially valuable data associated with the digital coupon to a user (e.g., merchant). On receiving the notify, share and/or re-share signal, the valuation module 302 can determine a consideration associated with sharing the digital coupon. The valuation module 302 can determine which user (e.g., initiator user 104, recipient user 106, etc.) receives the consideration. Further, the valuation module 302 can determine the value of the consideration and the type of consideration to be provided responsive to sharing the digital coupon 110a. The merchant may define the consideration. In one embodiment, the consideration may be predefined. In another embodiment, the consideration may be calculated in real time.

The user profile module 308 is configured to receive user information and store it in the database 318. Further, the user profile module 308 can retrieve user information upon request. In one embodiment, if a user is not registered with the advertisement server, the user profile module 308 can generate a signal that is transmitted to the computing device 102 of the user to prompt the user to register with the advertisement server 120. The user's information can include, but is not limited to personal information of the user, a picture of the user, a list of social networking platforms associated with the user, and likes and dislikes of the user.

In one embodiment, the user can be given an option not to register with the advertisement server 120 for purposes of protecting the privacy of the user. In another embodiment, the user can be given an option to remain anonymous. In a further embodiment, the user can be provided with an option to register with the advertisement server with user information that is encoded. For example, John Doe may choose to register with the advertisement server 120 by entering his name. Further, John Doe may be given the option to have his information encoded such that the name John Doe appears as user number 12934 for user privacy protection.

In one embodiment, the community module 312 can facilitate accessing social networking platforms or a local phonebook of a user to obtain a friend list of the user. The friend list of the user can be customized based on the users likes and/or dislikes using the processor 320. Further, the friend list can be populated in the computing device of the user (e.g., initiator user 104, recipient user 106, etc.) as a list of potential users with whom the digital coupon can be shared. Further, the community module can rank the list of friends (or other users) based on users that are most likely to re-share the digital coupon or redeem the digital coupon 110a. All appropriate user information can be stored in the database for further processing. The operation of the advertisement server 120 and/or the computing device 102 is described in further detail in association with FIG. 6.

Referring now to FIGS. 1A-3 and FIG. 6, FIG. 6 illustrates a method for value regulation based advertising, according to one or more example embodiments. In operation 601, the initiator computing device 102a acquires the digital coupon x having a value A. Once the digital coupon x is acquired, in operation 602 the initiator computing device 102a stores the digital coupon in the virtual wallet 112 using the control module 306. The virtual wallet 112 may be an application that is a client instantiation of the online storage server 114. Further, in operation 603, the initiator computing device 102a shares the digital coupon x with the recipient computing device 102b. The value of the digital coupon x can be changed prior to sharing or after the recipient computing device 102b receives the digital coupon. In an example embodiment of FIG. 6, the digital coupon x is transmitted with value A. In operation 604, the recipient computing device 102b receives the digital coupon x. In operation 605, the recipient computing device 102b sends an acknowledgment packet to the initiator computing device 102a indicating that the recipient computing device 102b has received the digital coupon x.

In operation 606, responsive to receiving the acknowledgement, the initiator computing device 102a transmits a share signal to the advertisement server 120. In operation 607, the advertisement server 120 determines a new value of the digital coupon x. In some embodiments, the value of the digital coupon x may not be changed. In operation 608, the advertisement server 120 can initiate a change in share status of the digital coupon. The change may be reflected in the initiator computing device 102a. The share status may indicate a number of times the digital coupon x has been shared, such as shared 1 time. In operation 609, the advertisement server may update the value of the digital coupon x if it has been changed. The new value is assigned and reflected at the recipient computing device 102b. The new value of the digital coupon x at the recipient computing device is B. In operation 610, the value of the digital coupon x is updated to reflect the new value B. Further, the digital coupon having value B may be associated with the recipient computing device 102b. The share status is reflected to indicate that the digital coupon x with value B is owned by the recipient computing device 102b.

In operation 611, the advertisement server 120 calculates a consideration for the initiator user 104 responsive to sharing the digital coupon x. In operation 612, the consideration is provided to the initiator user 104 and the consideration is updated at the virtual wallet 112 of the initiator user 104.

In an example embodiment, John Doe acquires a digital coupon 110a associated with merchant XYZ using his John Doe's smart phone (e.g., initiator computing device 102a). John Doe may have downloaded the digital coupon 110a using John Doe's desktop and saved it in his virtual wallet application. The virtual wallet application can be installed on multiple data processing devices. Further, the virtual wallet application can be a client instantiation of an online storage server 114. Saving the digital coupon in the virtual wallet application residing in John Doe's desktop can result in saving the digital coupon in the online storage server 114. John Doe can access the digital coupon 110a stored in the online storage server 114 through his smart phone (e.g., initiator computing device 102a) or any other device that has the virtual wallet application. The online storage server 114 may be a cloud based server. Once the digital coupon 110a is stored in the online storage server 114, an advertisement server 120 may be notified that the digital coupon 110a has been acquired. The advertisement server 120 may be associated with the merchant XYZ and/or a third party ABC. Further, the advertisement server 120 can be a cloud based server. The advertisement server 120 may include information associated with the digital coupon 110a that John Doe has acquired, such as John Doe's user information, the merchant XYZ associated with the digital coupon 110a and/or the value of the digital coupon 110a. The value of the digital coupon 110a acquired by John Doe may be a free espresso from any retail outlet of the merchant XYZ.

Once John Doe acquires the digital coupon 110a, the smart phone (e.g., initiator computing device 102a) may prompt John Doe to share and/or redeem the digital coupon 110a. John Doe may be presented with a list of users through his smart phone, with whom John Doe may share the digital coupon 110a. In one embodiment, the list of users may be selected based on the digital coupon 110a and/or the effectiveness of the users. For example, the digital coupon 110a is associated with coffee (e.g., espresso), so the list of users presented to John Doe may include users who like coffee or are appropriately associated with coffee. Further, the digital coupon 110a is associated with merchant XYZ, so the list of users can be customized to include users that are appropriately associated (e.g., likes) with merchant XYZ. In addition, the list of users can be customized to include users that have most effectively re-shared digital coupons in the past. Such information of effectiveness of the users may be available at the advertisement server 120. When the advertisement server 120 is notified that the digital coupon has been acquired by John Doe, the list of users and other related information may be transmitted to John Doe's smart phone (e.g., initiator computing device 102a). In one embodiment, the users may be registered with the advertisement server 120. If John Doe is not a registered user, John Doe may be prompted through the smart phone (e.g., initiator computing device 102a) to register with the advertisement server 120.

In one embodiment, John Doe can choose to share the digital coupon 110a with one or more users from the list of users. In another embodiment, John Doe can chose to share the digital coupon with any appropriate user external to the list of users. In the example embodiment, the list of users include Jane Roe and other users. John Doe may choose to share the digital coupon 110a with Jane Roe.

In one embodiment, John Doe's smart phone can send a notify signal to the advertisement server 120. The advertisement server 120 can calculate a second value of the digital coupon 110a. The second value of the digital coupon 110a is a $10 gift coupon associated with merchant XYZ. The second value may be assigned to the digital coupon 110a before it is transmitted to Jane Roe. The assignment may happen at the advertisement server 120 or at John Doe's smart phone (e.g., initiator computing device 102a). The digital coupon 110a having the second value can be transmitted to Jane Roe's smart phone (e.g., recipient computing device 102b) over an NFC link (e.g., peer to peer wireless communication link 108).

In another embodiment, John Doe's smart phone can establish an NFC link (e.g., peer to peer communication link 108) with Jane Doe's smart phone (e.g., recipient computing device 102b). Further, the digital coupon 110a having the first value can be transmitted to Jane Roe's smart phone over the NFC link. Jane Roe's smart phone (e.g., recipient computing device 102b) may send an acknowledgment to John Doe's smart phone (e.g., initiator computing device 102a). Jane Roe's smart phone may automatically save the digital coupon 110a in the virtual wallet application. John Doe's smart phone (e.g., initiator computing device 102a) can send a share signal 402 to the advertisement server 120. The advertisement server 120 can calculate the second value and assign the second value to the digital coupon stored in Jane Roe's virtual wallet. In one embodiment, the second value may be transmitted to Jane Roe's smart phone (e.g., recipient computing device 102b) and the second value may be assigned to the digital coupon 110a before saving it in Jane Roe's virtual wallet.

The share signal and/or the notify signal can include logging information that can be used by the advertisement server 120 to generate statistics associated with the marketing of the digital coupon 110a. In one embodiment, the logging information can be embedded in the digital coupon 110a that is transmitted between John Doe and Jane Roe. The logging information may be embedded by the John Doe's smart phone (e.g., initiator computing device 102a).

Once the digital coupon has been received by Jane Roe, the advertisement server may provide a consideration to John Doe. In the example embodiment, the consideration may be 2 free espressos from any retail outlet of merchant XYZ. If Jane Roe redeems the digital coupon 110a having the second value, then the consideration provided to John Doe may be of a higher value such as 2 free espressos and a $10 gift card associated with the merchant XYZ.

Using Jane Roe's smart phone, Jane Roe can be prompted to share the digital coupon 110a having a second value with another user. Jane Roe may be presented with a list of users including John Roe and other users. Jane Roe can transmit the digital coupon 110a having second value with John Roe's smart phone (e.g., second recipient computing device 102c)

over an NFC link or any appropriate communication link. As per the description in the foregoing paragraphs, John Roe may receive the digital coupon 110a having a third value. In some embodiment, the first, second and/or third values may be the same. Once John Roe receives the digital coupon, Jane Roe (e.g., recipient user 106a) and John Doe (e.g., initiator user 104) may receive appropriate considerations responsive to Jane Roe sharing the digital coupon 110a with John Roe. In the example embodiment, the consideration provided to Jane Roe can be 10 hours of free Wi-Fi connectivity at any store of merchant XYZ.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method for sharing a digital coupon, comprising:
    receiving, at an advertisement server, a share signal indicating a transfer of a digital coupon having a first value from an initiator computing device to a recipient computing device over a near-field communication (NFC) link;
    determining, at the advertisement server, a second value of the digital coupon based on a set of predetermined criteria responsive to receiving the share signal;
    assigning, at the advertisement server, the second value to the digital coupon when the digital coupon is received by the recipient computing device;
    receiving, at the advertisement server, a re-share signal indicating a transfer of the digital coupon having the second value from the recipient computing device to a second recipient computing device over a second NFC link;
    determining, at the advertisement server, a third value of the digital coupon based on the set of predetermined criteria responsive to the transfer of the digital coupon from the recipient computing device to the second recipient computing device;
    assigning, at the advertisement server, the third value to the digital coupon when the digital coupon is received by the second recipient computing device;
    providing, by the advertisement server, a recipient consideration to the recipient computing device responsive to sharing the digital coupon from the recipient computing device to the second recipient computing device;
    providing, by the advertisement server, an additional recipient consideration to the recipient computing device when the digital coupon is redeemed by the second recipient computing device; and
    providing, by the advertisement server, a second initiator consideration to the initiator computing device responsive to sharing the digital coupon from the recipient computing device to the second recipient computing device.

2. The method of claim 1, wherein assigning the second value to the digital coupon further comprises:
    transmitting the second value of the digital coupon to a virtual wallet associated with the recipient computing device to update the value of the digital coupon stored in the virtual wallet to the second value responsive to receiving the share signal,
        wherein the virtual wallet is represented by an online storage device.

3. The method of claim 1, further comprising providing a first initiator consideration to the initiator computing device responsive to receiving the share signal.

4. The method of claim 1, further comprising providing an additional first initiator consideration to the initiator computing device when the digital coupon is redeemed by the recipient computing device.

5. The method of claim 1, wherein the set of predetermined criteria is at least one of:
    a number of times the digital coupon is shared, and
    a degree of separation between two of an initiator user, a recipient user and a second recipient user.

6. A computer implemented method, comprising:
    acquiring, by an initiator computing device, a digital coupon having a first value from an advertisement media;
    responsive to acquiring the digital coupon, presenting, by the initiator computing device, a subset of users with whom to share the digital coupon, wherein the subset of users is selected from a set of users based on the content of the digital coupon;
    ranking, by the initiator computing device, the subset of users based on a probability of each user in the subset sharing the digital coupon with another user;
    displaying a prompt, by the initiator computing device, to share the digital coupon with a recipient computing device selected from the subset of users;
    sharing the digital coupon with a recipient computing device over a peer to peer wireless communication link;
    transmitting a share signal to an advertisement server to determine a second value of the digital coupon by the advertisement server responsive to receiving the share signal,
        wherein the share signal indicates the sharing of the digital coupon from an initiator computing device to the recipient computing device over a peer to peer wireless link;
    receiving a first consideration responsive to sharing the digital coupon with the recipient computing device;

receiving a second consideration responsive to the recipient computing device sharing the digital coupon with a another recipient computing device; and displaying, by the initiator computing device, a trail associated with the sharing of the digital coupon.

7. The method of claim 6, wherein the second value is assigned to the digital coupon when the recipient computing device receives the digital coupon shared by the initiator computing device.

8. A computer implemented method, comprising:

receiving, by a recipient computing device, a digital coupon having a first value transmitted from an initiator computing device over a near-field communication (NFC) link;

transmitting, by the recipient computing device, a share signal to an advertisement server to determine a second value of the digital coupon by the advertisement server responsive to receiving the share signal, wherein the share signal indicates a sharing of the digital coupon from an initiator computing device to the recipient computing device over the NFC link;

storing the digital coupon having the second value in a virtual wallet associated with the recipient computing device;

sharing the digital coupon having the second value with a second recipient computing device;

initiating a change in value of the digital coupon having the second value responsive to sharing the digital coupon with the second recipient computing device;

transmitting a re-share signal to the advertisement server to determine a third value of the digital coupon based on a set of predetermined criteria responsive to sharing the digital coupon from the recipient computing device to the second recipient computing device, wherein the third value is assigned to the digital coupon when the digital coupon is received by the second recipient computing device; and receiving, by the recipient computing device from the advertisement server, a recipient consideration responsive to sharing the digital coupon with the second recipient computing device.

9. A system, comprising:

an advertisement server configured to:

receive a share signal indicating a transfer of a digital coupon having a first value from an initiator computing device to a recipient computing device over a peer to peer wireless link;

determine a second value of the digital coupon based on a set of predetermined criteria responsive to receiving the share signal;

assign the second value to the digital coupon when the digital coupon is received by the recipient computing device;

transmit the second value of the digital coupon to a virtual wallet associated with the recipient computing device to update the value of the digital coupon stored in the virtual wallet;

receive a re-share signal indicating a transfer of the digital coupon having the second value from the recipient computing device to a second recipient computing device over a second peer to peer wireless link;

determine a third value of the digital coupon based on the set of predetermined criteria responsive to the transfer of the digital coupon from the recipient computing device to the second recipient computing device;

assign the third value to the digital coupon when the digital coupon is received by the second recipient computing device;

receive logging information for the digital coupon, wherein the logging information is embedded in at least one of the share signal, a notify signal and the re-share signal;

determine an influence of the digital coupon based on the logging information; and display the influence of the digital coupon via an output module of the advertisement server.

10. The system of claim 9, wherein the advertisement server is configured to receive, from the initiator computing device, a notify signal indicating an intent to share the digital coupon with the recipient computing device.

11. The system of claim 9, wherein the advertisement server is configured to provide a first initiator consideration to the initiator computing device responsive to receiving the share signal.

12. The system of claim 9, wherein the advertisement server is configured to provide the first initiator consideration to the initiator computing device when the digital coupon is redeemed by the recipient computing device.

13. The system of claim 9, wherein the advertisement server is configured to:

provide a recipient consideration to the recipient computing device responsive to sharing the digital coupon from the recipient computing device to the second recipient computing device;

provide an additional recipient consideration to the recipient computing device when the digital coupon is redeemed by the second recipient computing device; and provide a second initiator consideration to the initiator computing device responsive to sharing the digital coupon from the recipient computing device to the second recipient computing device.

14. The system of claim 9, wherein the set of predetermined criteria is at least one of:

a number of times the digital coupon is shared, and a degree of separation between two of an initiator user, a recipient user and a second recipient user.

* * * * *